United States Patent
Nissinen et al.

(10) Patent No.: US 7,595,034 B2
(45) Date of Patent: *Sep. 29, 2009

(54) CATALYTIC PROCESS FOR REDUCING NITROGEN OXIDES IN FLUE GASES AND REDUCING AGENT COMPOSITION

(75) Inventors: Timo Nissinen, Tampere (FI); Jari Kukkonen, Oulu (FI)

(73) Assignee: Kemira Oyj, Helsinki (FI)

( * ) Notice: Subject to any disclaimer, the term of this patent is extended or adjusted under 35 U.S.C. 154(b) by 344 days.

This patent is subject to a terminal disclaimer.

(21) Appl. No.: 10/544,397

(22) PCT Filed: Feb. 4, 2004

(86) PCT No.: PCT/FI2004/000057

§ 371 (c)(1),
(2), (4) Date: Jan. 6, 2006

(87) PCT Pub. No.: WO2004/069385

PCT Pub. Date: Aug. 19, 2004

(65) Prior Publication Data

US 2006/0147362 A1    Jul. 6, 2006

(30) Foreign Application Priority Data

Feb. 4, 2003    (FI)    ................... 20030168

(51) Int. Cl.
*B01D 53/56* (2006.01)
*B01D 53/94* (2006.01)
*C09K 3/00* (2006.01)

(52) U.S. Cl. ............ 423/213.2; 423/239.1; 252/182.11; 252/182.12

(58) Field of Classification Search .............. 423/239.1, 423/213.2; 252/182.11, 182.12
See application file for complete search history.

(56) References Cited

U.S. PATENT DOCUMENTS

| 3,900,554 | A |   | 8/1975  | Lyon                    |
|-----------|---|---|---------|-------------------------|
| 4,792,439 | A |   | 12/1988 | Schneider               |
| 4,873,066 | A |   | 10/1989 | Epperly et al.          |
| 5,045,292 | A | * | 9/1991  | Ruegg et al. ... 423/235 |
| 5,116,584 | A |   | 5/1992  | Chen et al.             |
| 5,139,755 | A | * | 8/1992  | Seeker et al. ... 423/235|
| 5,536,482 | A | * | 7/1996  | Diep et al. ... 423/235  |

FOREIGN PATENT DOCUMENTS

DE    4 221 451 A1    1/1994

(Continued)

OTHER PUBLICATIONS

F.F. Mao et al. "Urea-ethanol-water solution for diesel $NO_x$ control Using Urea", $6^{th}$ Diesel Engine Emissions Reduction (Deer) Workshop Aug. 20-24.

(Continued)

*Primary Examiner*—Timothy C Vanoy
(74) *Attorney, Agent, or Firm*—Birch, Stewart, Kolasch & Birch, LLP

(57) ABSTRACT

The invention relates to a catalytic process for reducing nitrogen oxides in flue gases, in which process a reducing agent containing composition is mixed with flue gas and the mixture achieved is brought into contact with a catalyst. In accordance with the invention, the composition contains e.g. 1 to 60% of weight of ammonium formate. Especially a low freezing point can be achieved with such water containing composition. In addition, a good reduction conversion is achieved even at low temperatures.

32 Claims, 1 Drawing Sheet

U.S. PATENT DOCUMENTS 6,280,695 B1 *  8/2001  Lissianski et al. ........ 423/239.1
6,387,336 B2    5/2002  Marko et al.

FOREIGN PATENT DOCUMENTS

| | | | |
|---|---|---|---|
| DE | 42 21 451 A1 * | 1/1994 | |
| EP | 0 487 886 A1 | 6/1992 | |
| GB | 1 111 936 A | 5/1968 | |
| RU | 2 088 316 | 8/1997 | |

OTHER PUBLICATIONS

Solla et al., Effect of Ammonium Formate and Mixtures of Urea and Ammonium Formate on Low Temperature Activity of SCR Systems, SAE International 2005-01-1856, Apr. 2005, pp. 661-668.

* cited by examiner

CATALYTIC PROCESS FOR REDUCING NITROGEN OXIDES IN FLUE GASES AND REDUCING AGENT COMPOSITION

FIELD OF TECHNOLOGY

The invention relates to catalytic reduction of nitrogen oxides in flue gases. The method is applicable especially in combustion processes, such as in a diesel combustion process, for treating exhaust gases for example in vehicles. In addition, the process can be applied for example in treating flue gases in industry and in energy production.

BACKGROUND

The amount of nitrogen oxides ($NO_x$) in flue gases from combustion processes can be decreased by reducing these oxides. For this purpose, one can use compounds containing ammonium nitrogen, such as ammonia, urea, ammonium carbamate, ammonium carbonate, ammonium bicarbonate, ammonium formate, ammonium oxalate or ammonium hydroxide.

In nitrogen oxide removal, one significant alternative is to use selective catalytic reduction (SCR techniques), in which nitrogen oxides are reduced to nitrogen and water by means of a catalyst and a reducing agent. Especially ammonia and urea have been used as reducer. The reduction temperature has usually been 265 to 425° C., typically 350 to 400° C. For example $V_2O_5$—$TiO_2$ catalyst has been used as catalyst.

In SCR techniques for vehicles, ammonia and ammonia water cause problems due to operational safety reasons. Consequently, it is preferred to use urea, for instance, which is almost risk-free. Another reason for the advantageous use of urea is that it contains twice as much nitrogen per mol as the ammonium salts mentioned above. In fact, an aqueous solution of urea is a very expedient nitrogen oxide remover. Urea is dissolved to an approx. 32.5% of weight solution, whereby solubility is adequate and temperature stability lowest (approx. −11° C.).

However, in Northern Europe and colder regions in general, the problem is that the outdoor temperature is often below −11° C., so that there is an evident risk of freezing of the urea solution. The freezing problems can be reduced by installing various temperature trackers and resistors by which the freezing is mainly prevented or by which a frozen urea solution is dissolved back to liquid form.

Literature mentions the use of ethanol [F. F. Mao et al. "Urea-ethanol-water solution for diesel NOx control Using Urea", 6$^{th}$ Diesel Engine Emissions Reduction (DEER) Workshop August 20-24] and propylene glycol [Lambert et al. "Application of Organic Freeze-Point Depressant in Aqueous Urea Solution: Effect of Nox Reduction", SAE2003-01-0775] as anti-freezing agents of urea water solution in the reduction of nitrogen oxides of exhaust gases in diesel combustion process. Publication No. U.S. Pat. No. 6,387,336 discloses that it is possible to decrease the freezing point of urea water solution with additives, such as ammonium formate (column 1 lines 46-60). According to the publication these additives are, however, especially corrosive, so their use is problematic. As a further disadvantage is considered that due to the water contained in the composition, the temperature of the exhaust gas will decrease weakening the activity of the catalyst. Therefore, ammonia is used as $NO_x$ reducing agent in accordance with the publication.

Also selective non-catalytic reduction (SNCR techniques) is used. For example in publication No. U.S. Pat. No. 5,116,584 especially the SNCR techniques is described. Usually a relatively high temperature, typically 900 to 1000° C., is used in SNCR techniques. Publication No. U.S. Pat. No. 3,900,554, however, discloses a process, in which ammonia, ammonium formate, ammonium oxalate or ammonium carbonate is used as reducing agent and in which the temperature of exhaust gases is 704 to 1093° C. Publication No. U.S. Pat. No. 4,873,066, in turn, discloses a SNCR process, in which tri-ammonium citrate or ammounium formate is used as reducing agent, so that the temperature of exhaust gases can be relatively low, below 649° C. 482° C. is mentioned as the lowest temperature.

GENERAL DESCRIPTION OF THE INVENTION

Figure 1:
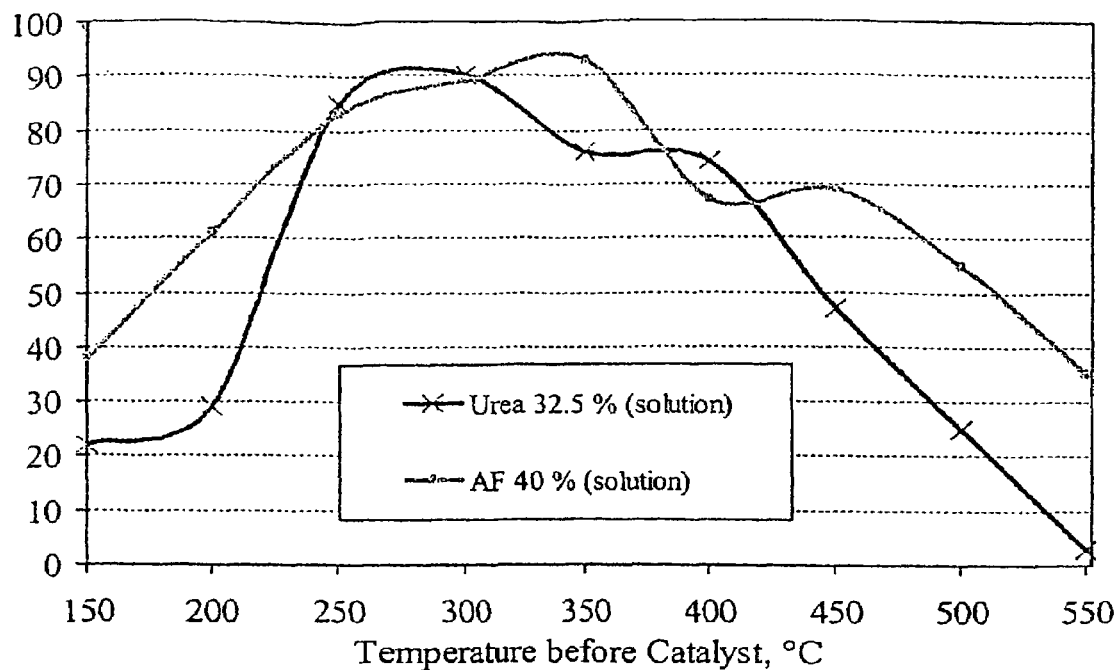
FIG. 1 presents the conversion of urea solution only and of ammonium formate solution only, and FIG. 2 additionally presents a conversion of three urea ammonium formate solutions.
Figure 2:
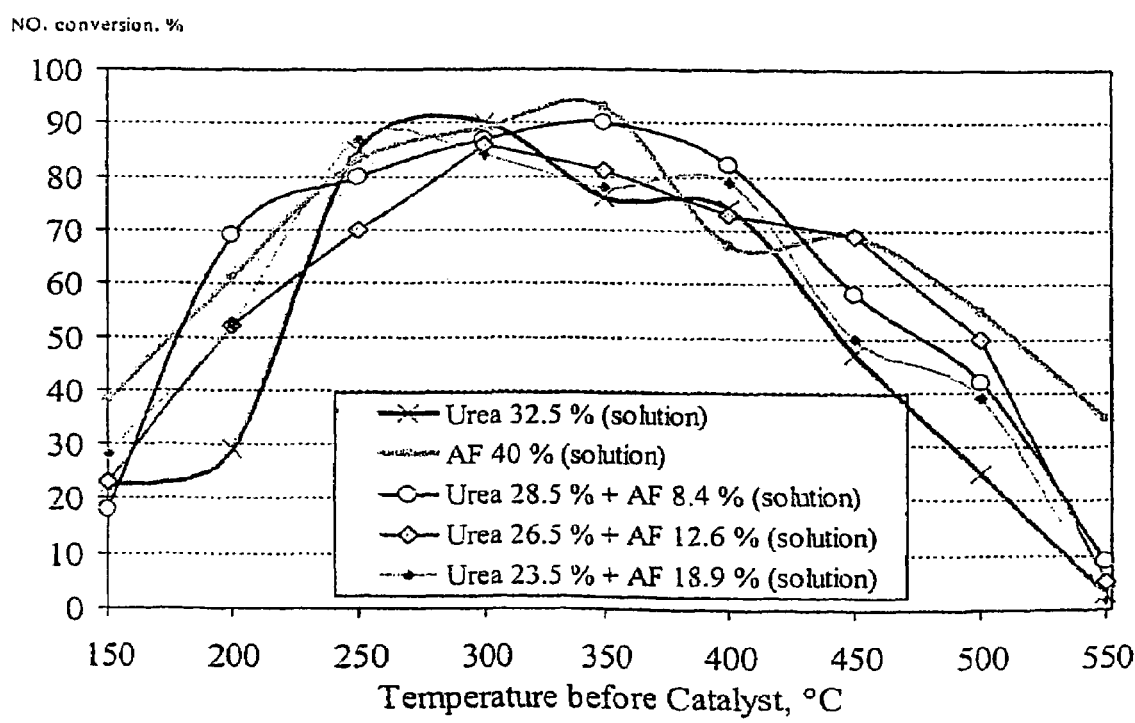

As defined in the independent claims, there has now been invented a process for reducing nitrogen oxides and a reducing agent composition used in the process. The dependent claims define some preferred embodiments of the invention.

The concentration of ammonium formate in the composition may be e.g. 1 to 60% of weight, especially 10 to 50% of weight, preferably 35 to 45% of weight. The composition may be a solution or dispersion, for example. The liquid in the composition is usually aqueous, for example just water.

In addition to ammonium formate, the reducing agent composition may contain one or several other reducing agents for nitrogen oxides. The reducing agent may be a compound comprising especially ammonium nitrogen, such as ammonia, urea, ammonium carbamate, ammonium carbonate, ammonium bicarbonate, ammonium oxalate or ammonium hydroxide. The concentration of reducing agent in the composition may be e.g. 1 to 40% of weight, preferably 10 to 30% of weight. Thus, the concentration of ammonium formate can be especially 1 to 40% of weight, preferably 10 to 30%. Especially urea may be used.

The composition may also contain other necessary additives, such as anti-corrosive agents, for example alcohol, such as propanol or propargylalcohol, or other anti-corrosive agents of known organic salts and acids, such as sulphonium compounds and alkyl ammonium compounds.

Any catalyst suitable for SCR techniques and able to function at said temperature and efficient and durable enough in the operational conditions, may be used as catalyst. For example $V_2O_5$—$WO_3$, zeolite or $V_2O_5$—$TiO_2$ catalyst can preferably be used as catalyst.

The upper limit of the reduction temperature may be for example 700° C., such as 550° C., more particularly 350° C., most particularly 250° C. The lower limit may be for example 120° C., such as 150° C. The particular advantage of the invention is its functionality (i.e. not just good conversion, but overall functionality) at low temperatures, such as between 120 and 250° C.

Compositions that endure without freezing even at very low temperatures can be produced in accordance with the invention. The processing of the composition is thus easier not only in the actual use but also in transportation, storage and delivery. Ammonium formate is effective in decreasing the freezing point of an aqueous solution of urea, for instance. Thus, ammonium formate has also the advantage of acting as such as a nitrogen oxide reducer.

In accordance with the invention, the reduction can also be performed by very good conversions also at low temperatures. For example, when added to urea solution, the ammonium formate enhances the conversion of $NO_X$ at temperatures between 150 and 550° C., for instance, particularly between 150 and 250° C. This is advantageous especially after a cold start, when the temperatures of engine, exhaust gases and catalyzer are low. The process is suitable for use for example for cleaning the exhaust gases in a diesel combustion process. The process is especially suitable for use in diesel vehicles. Efficient cleaning also at low temperatures is then especially advantageous. For example many city buses and smaller vehicles run long periods at very low engine temperatures.

When using the process and the composition in accordance with the invention, the vehicle has a container for the reducing agent composition. The composition is fed through the feeding apparatus (pump, pipe system, nozzles etc.) to the SCR catalyzer in the exhaust gas line. In addition to the SCR catalyzer, the system can comprise pre-oxidation, hydrolysis, and post-oxidation catalyzers. It has also been found that in this kind of a process the use ammonium formate does not cause any particular corrosion problems in materials normally used in the equipment, such as in stainless steel and in plastics.

The invention can also be used in industry and in energy production, e.g. in power plants and in fuel boiler applications.

EXAMPLE

The invention is described in further detail below by means of examples.

Decreasing the Freezing Point of a Urea Solution

Measurements were made with a view to determine the operability of ammonium formate as an anti-freezing agent of an aqueous solution of urea.

| Solution [% of weight] | Freezing point [° C.] |
|---|---|
| 30% urea | −11 |
| 20% urea + 20% ammonium formate | −26.5 |
| 30% urea + 10% ammonium formate | −21.5 |

The measurements showed that relatively strong undercooling occurred each time in the solutions. The minimum temperature reached approx. 5 degrees below the indicated freezing point. Thus, for instance, 20% urea+20% ammonium formate solution started freezing at −31° C., and subsequently the temperature rose to −26.5° C., which was then registered as the freezing point of this particular solution.

In terms of practical applications, a freezing point of −20° C. of the solution will be sufficient.

Since undercooling increases in the course of time, measurements were made in order to determine the long-term effect of ammonium formate as an anti-freezing agent of an aqueous solution of urea. At the same time, the freezing behaviour of a pure ammonium formate water was measured at temperatures below −20° C. The tests were conducted in a deep-freezing container, whose temperature was adjusted to the desired level each time.

| | Freezing period [days] at a temperature of −22° C. | | |
|---|---|---|---|
| Solution [% of weight] | 1 day | 2 days | 5 days |
| 10% ammonium formate | frozen | — | — |
| 20% ammonium formate | liquid | liquid | frozen |
| 30% ammonium formate | liquid | liquid | liquid |
| 40% ammonium formate | liquid | liquid | liquid |
| 50% ammonium formate | liquid | frozen | frozen |
| 60% ammonium formate | frozen | frozen | frozen |
| 30% urea + 20% ammonium formate | liquid | liquid | liquid |
| 30% urea + 30% ammonium formate | liquid | liquid | frozen |
| 30% urea + 2.5% ammonium formate | frozen | frozen | frozen |
| 30% urea + 5.0% ammonium formate | liquid | frozen | frozen |
| 30% urea + 7.5% ammonium formate | liquid | frozen | frozen |

Next the temperature of the container was decreased to −25° C. 30% of weight ammonium formate, 40% of weight ammonium formate and 30% of weight urea+30% of weight ammonium formate still remained liquid.

The measurements allow the conclusion that the frost resistance of the aqueous solution of urea is appreciably improved already with an addition of 10% of weight ammonium formate. The frost resistance of a 30 to 40% of weight aqueous solution of ammonium formate is also sufficient for practical applications.

Effect on $NO_X$ Emissions

The effect of ammonium formate (AF) on the reduction process of nitrogen oxides was examined.

The tests used a SCR catalyst w5935 from Ecocat Oy, which was aged (600° C./5 h) n 2.4 $V_2O_5$-13 $WO_3$/$TiO_2$—$SiO_2$ based catalyst. The composition of the feed was: NO 1000 ppm, urea or ammonium formate corresponding to the ammonium consistency 1000 ppm, oxygen 10%, water 8%, the rest being nitrogen. The running speed was 25 000 $h^{-1}$. The figures present the conversion of $NO_X$ at different temperatures. The first figure presents the conversion of urea solution only and of ammonium formate solution only. The second figure presents additionally a conversion of three urea ammonium formate solutions. The figures show that ammonium formate enhances the conversion of $NO_x$. The enhancement is especially significant between 150 and 250° C.

The invention claimed is:

1. A catalytic process for reducing nitrogen oxides in flue gases of diesel vehicles in which process a reducing agent composition containing ammonium formate and one or more other nitrogen oxide reducing agents is mixed with the gases, and the mixture obtained is brought into contact with a $V_2O_5$—$WO_3$, zeolite or $V_2O_5$—$TiO_2$ catalyst in order to perform a reduction reaction at a temperature of 120 to 700° C.

2. A process as defined in claim 1, in which the reducing agent composition contains 1 to 60% of weight of ammonium formate.

3. A process as defined in claim 2, in which the reducing agent composition contains 10 to 50% of weight of ammonium formate.

4. A process as defined in claim 3, in which the reducing agent composition contains 35 to 45% of weight of ammonium formate.

5. A process as defined in claim 1, in which the reduction reaction is performed at a temperature which is 550° C. at maximum.

6. A process as defined in claim 5, in which the reduction reaction is performed at a temperature which is 450° C. at maximum.

7. A process as defined in claim 6, in which the reduction reaction is performed at a temperature which is 350° C. at maximum.

8. A process as defined in claim 7, in which the reduction reaction is performed at a temperature which is 250° C. at maximum.

9. A process as defined in claim 1, in which the reduction reaction is performed at a temperature, which is 150° C. at minimum.

10. A process as defined in claim 1, in which the reducing agent composition contains water.

11. A process as defined in claim 1, in which the reducing agent composition, in addition to ammonium formate, contains one or more other nitrogen oxide reducing agents containing ammonium nitrogen.

12. A process as defined in claim 11, in which the reducing agent composition, in addition to ammonium formate, contains one or more other nitrogen oxide reducing agents selected from the group consisting of ammonia, urea, ammonium carbamate, ammonium carbonate, ammonium bicarbonate, ammonium oxalate and ammonium hydroxide.

13. A process as defined in claim 12, in which the other reducing agent is urea.

14. A process as defined in claim 1, in which the reducing agent composition contains 1 to 40% of weight of the other reducing agent.

15. A process as defined in claim 14, in which the reducing agent composition contains 10 to 30% of weight of the other reducing agent.

16. A process as defined in claim 1, in which the reducing agent composition contains 1 to 40% of weight of ammonium formate.

17. A process as defined in claim 16, in which the reducing agent composition contains 10 to 30% of weight of ammonium formate.

18. A process as defined in claim 1, in which the catalyst is $V_2O_5$—$WO_3$ or $V_2O_5$—$TiO_2$.

19. A catalytic process for reducing nitrogen oxides in flue gases of diesel vehicles, in which process a reducing agent composition containing ammonium formate and one or more other nitrogen oxide reducing agents is mixed with the gases, and the mixture obtained is brought at a temperature of 120 to 700° C. into contact with a catalyst suitable for selective catalytic reduction techniques at that temperature.

20. A reducing agent composition to be added to a catalytic reduction process of nitrogen oxides in flue gases of diesel vehicles, whereby the reduction temperature is 120 to 700° C., the catalyst is suitable for selective catalytic reduction techniques and is able to function at said temperature, wherein the composition contains 1 to 60% by weight of ammonium formate and one or more other nitrogen oxide reducing agents.

21. A composition as defined in claim 20, wherein the composition contains water.

22. A composition as defined in claim 21, wherein the composition contains 10 to 50% of weight of ammonium formate.

23. A composition as defined in claim 22, wherein the composition contains 35 to 45% of weight of ammonium formate.

24. A composition as defined in claim 23, wherein the composition, in addition to ammonium formate, contains one or more other nitrogen oxide reducing agents.

25. A composition as defined in claim 24, wherein the composition, in addition to ammonium formate, contains one or more other nitrogen oxide reducing agents containing ammonium nitrogen.

26. A composition as defined in claim 25, wherein the composition, in addition to ammonium formate, contains one or more other nitrogen oxide reducing agents selected from the group consisting of ammonia, urea, ammonium carbamate, ammonium carbonate, ammonium bicarbonate, ammonium oxalate and ammonium hydroxide.

27. A composition as defined in claim 26, wherein the other reducing agent is urea.

28. A composition as defined in claim 27, wherein the composition contains 20 to 30% of weight of the other reducing agent.

29. A composition as defined in claim 28, wherein the composition contains 10 to 30% of weight of ammonium formate.

30. A composition as defined in claim 29, wherein the composition contains anti-corrosion agents.

31. A composition as defined in claim 21, wherein the composition contains 1 to 40% of weight of ammonium formate.

32. A composition as defined in claim 23, wherein the composition contains 1 to 40% of weight of the other reducing agent.

* * * * *

UNITED STATES PATENT AND TRADEMARK OFFICE
CERTIFICATE OF CORRECTION

PATENT NO. : 7,595,034 B2  
APPLICATION NO. : 10/544397  
DATED : September 29, 2009  
INVENTOR(S) : Nissinen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this

Twenty-eighth Day of September, 2010

David J. Kappos  
*Director of the United States Patent and Trademark Office*